Dec. 25, 1928.  1,696,550
P. MEYER
MACHINE FOR DRILLING, TAPPING, AND THE LIKE
Filed April 7, 1927  4 Sheets-Sheet 1

INVENTOR
Peter Meyer
BY
T. F. Bourne
ATTORNEY

Dec. 25, 1928.
P. MEYER
1,696,550
MACHINE FOR DRILLING, TAPPING, AND THE LIKE
Filed April 7, 1927    4 Sheets-Sheet 2
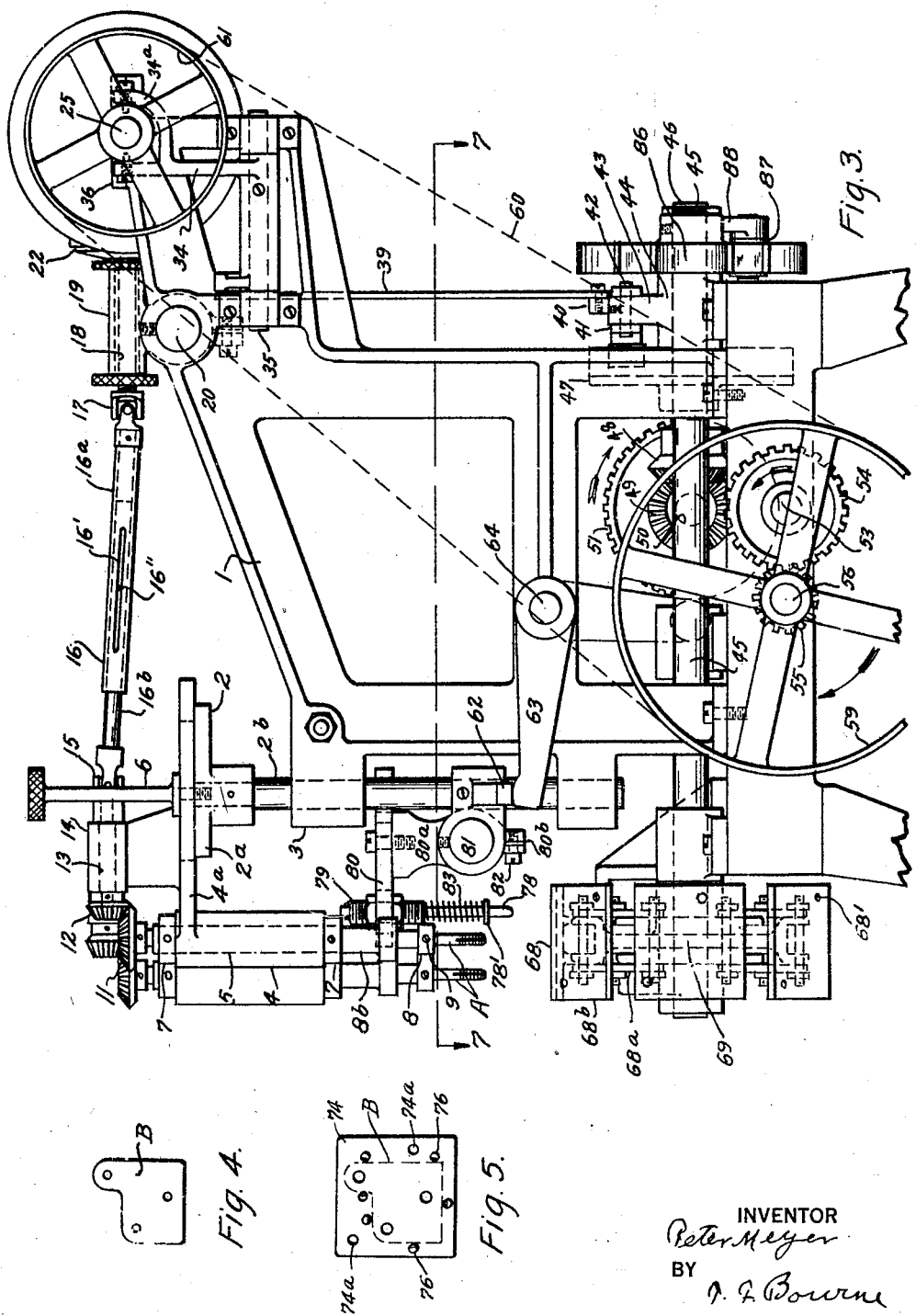
INVENTOR
Peter Meyer
BY
J. F. Bourne
ATTORNEY Dec. 25, 1928.

P. MEYER 1,696,550

MACHINE FOR DRILLING, TAPPING, AND THE LIKE

Filed April 7, 1927     4 Sheets-Sheet 4

INVENTOR
Peter Meyer
BY
T. F. Bourne
ATTORNEY

Patented Dec. 25, 1928.

1,696,550

UNITED STATES PATENT OFFICE.

PETER MEYER, OF NEWARK, NEW JERSEY.

MACHINE FOR DRILLING, TAPPING, AND THE LIKE.

Application filed April 7, 1927. Serial No. 181,636.

My invention relates to improvements in machines adapted to simultaneously operate tools, such as for drilling, tapping or reaming holes in articles that are successively fed to the working position.

One of the objects of my invention is to regulate or control the speed of operation of any of the tools in accordance with the work required.

Another object of the invention is to permit the ready location of any of the tools in operative position with respect to the work to be performed.

Another object is to permit ready adjustment relatively to the tools of the carrier for the work.

Other objects and features of construction and improvement will be more fully hereinafter set forth and then pointed out in the claims.

Reference is to be had to the accompanying drawings forming a part hereof, wherein Fig. 1 is a front elevation of a machine embodying my invention;

Fig. 3 is a side elevation looking from the rght hand side of Fig. 1;

Figs. 4 and 5 are details of the work and work support;

Figure 6:
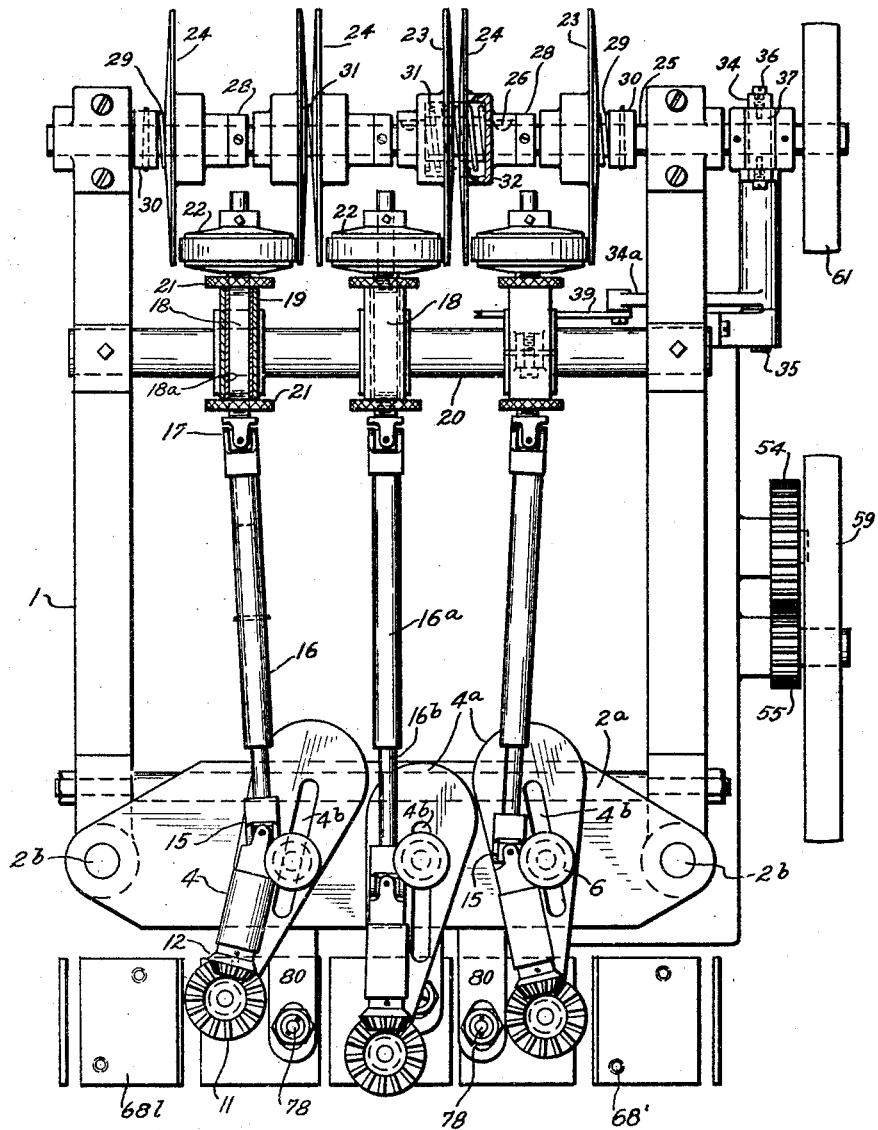
Fig. 6 is a plan view.
Figure 6A:
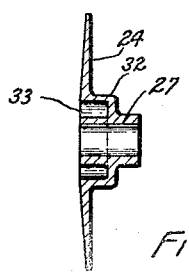
Figure 7:
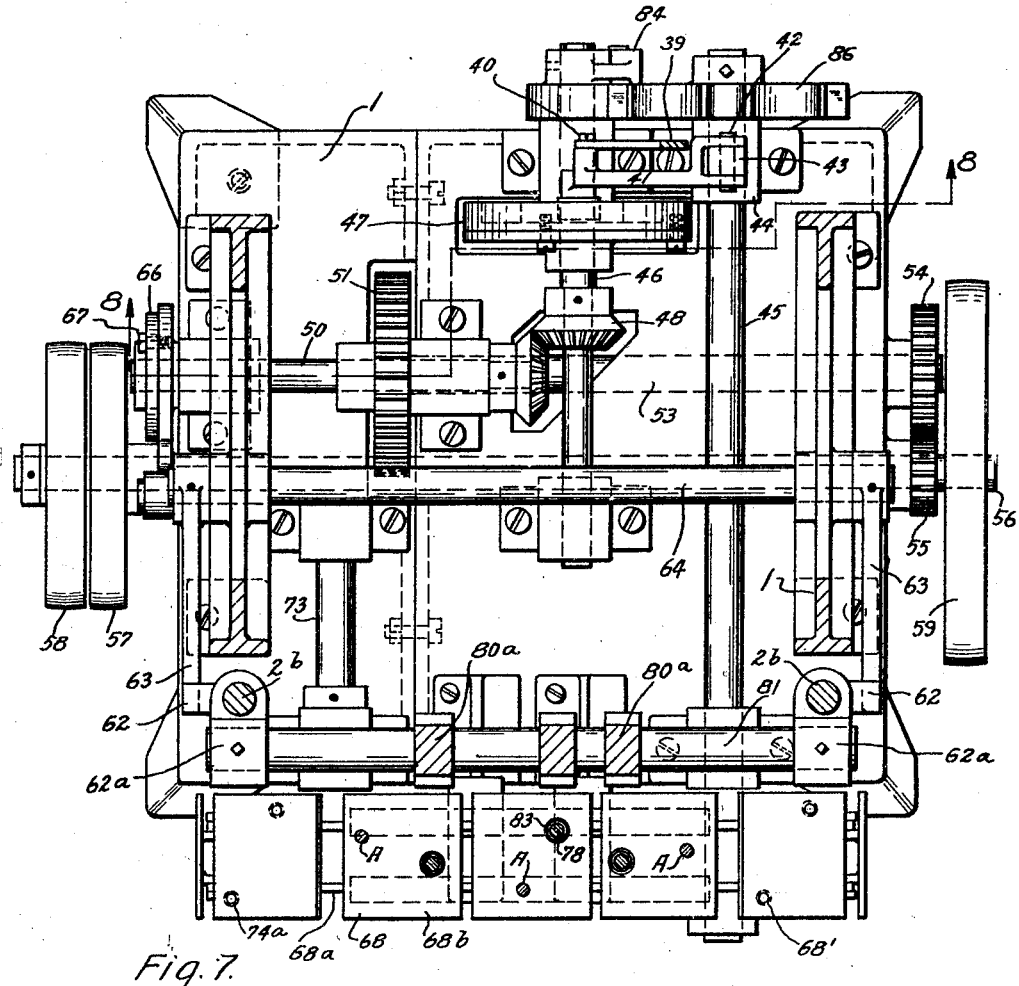

Fig. 6$^a$ is a sectional detail;

Fig. 7 is a horizontal section substantially on line 7, 7, in Fig. 3; and

Figure 8:
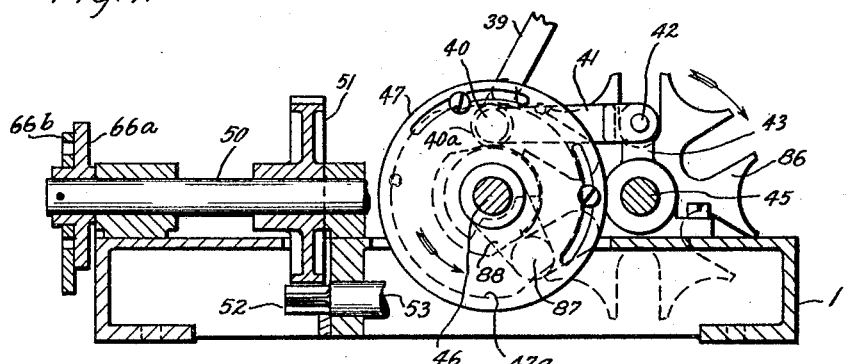

Fig. 8 is a section substantially on line 8, 8, in Fig. 7.

Similar numerals of reference indicate corresponding parts in the several views.

Figures 1, 2:
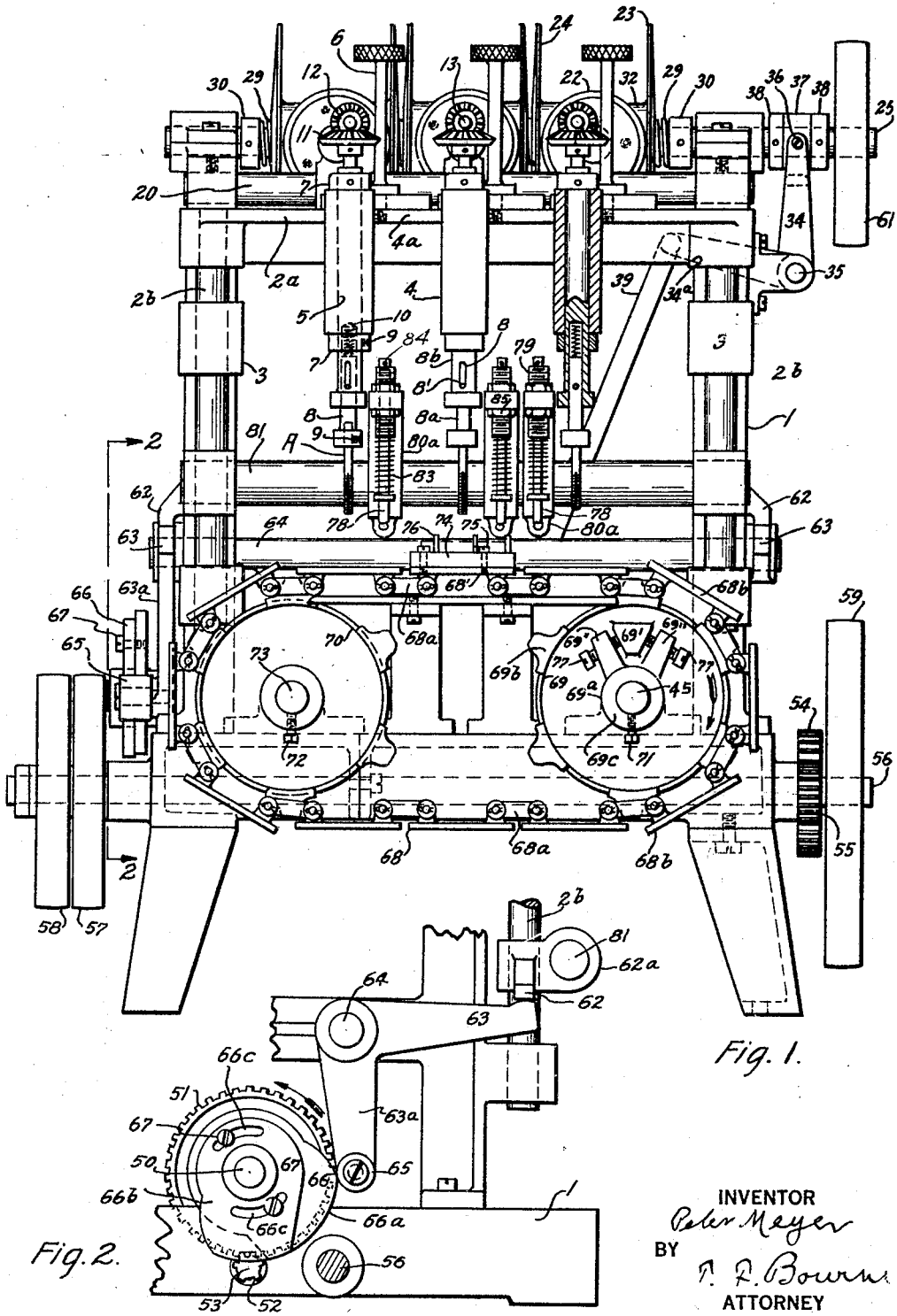
Fig. 2 is a detail side view partly in section on line 2, 2, in Fig. 1.

The numeral 1 indicates the main frame of the machine, which may be of any suitable construction. A reciprocative tool carrier is indicated at 2, shown comprising a cross member or bar 2$^a$ from which spaced guide rods 2$^b$ depend through guiding bearings 3 on the main frame. The member 2$^a$ carries vertically disposed spaced guide bearings 4 in which tool-carrying spindles 5 are journaled, (Fig. 1). The bearings 4 are shown provided with laterally disposed arms 4$^a$ which are provided with slots 4$^b$ receiving screws 6 that enter threaded apertures in the member 2$^a$, (Fig. 6), whereby the bearings 4 with the spindles 5 may be adjusted angularly and radially respecting the work to be drilled, tapped or the like. The spindles 5 are shown provided with collars or stops 7 at opposite ends of the bearings 4 for rotatively supporting the spindles and limiting longitudinal movement thereof in the bearings. The spindles 5 carry tool holders 8 for the tools A, which latter may be drills, taps, reamers or the like according to the work to be performed. The tool holder is shown comprising telescopic members 8$^a$, 8$^b$, the member 8$^a$ being shown provided with a pin 8' operative in slot 8'' of member 8$^b$, which latter member is adapted to be detachably secured at the end of the corresponding spindle 5, as by a screw at 9, (Fig. 1). The pin and slot cause rotation of member 8$^a$ with member 8$^b$ and permit limited longitudinal movement of member 8$^a$. The member 8$^b$ contains a spring 10 operative against the member 8$^a$ for normally pushing the latter outwardly toward the work and to resiliently resist the latter, the pin 8' stopping against the metal at the lower end of slot 8''. When the tools engage the articles B the springs 10 will compress to relieve the pressure and to allow the carrier to rise initially without injury to the tools as their rotation reverses. Spindles 5, at their upper ends, are shown provided with bevel gears 11 in mesh with bevel gears 12 on spindles 13 journaled in bearings 14 on the corresponding arm 4$^a$. Spindles 13 are shown connected by universal joints 15 with corresponding telescopic drive shafts 16. Said shafts are shown each comprising a tubular member 16$^a$ and rod 16$^b$ slidable therein, the member 16$^a$ being shown provided with a longitudinal slot 16' receiving pin 16'' from rod 16$^b$, (Fig. 3), for rotating the rod by member 16$^a$ and permitting longitudinal adjustment of the rod in accordance with the adjustment of the corresponding arm 4$^a$. Each shaft 16 is shown connected by means of a universal joint 17 with a spindle 18 journaled in bearings 19 supported by a cross bar 20 on the main frame. The spindles 18 are provided with threaded end portions receiving nuts 21 adapted to bear against the adjacent ends of the bearings 19, whereby said spindles may be adjusted longitudinally in accordance with the desired speed of rotation of the corresponding tool. Each spindle 18 is provided with a friction driving disk 22 adapted to be alternately engaged by either friction drive disk 23 or 24 of a corresponding pair of disks which are located on opposite sides and diametrically disposed respecting the corresponding disk 22, (Fig. 6). Each pair of disks 23, 24 is rotatively carried by shaft 25 journaled in bearings on the main frame, which disks are slidably carried upon the shaft 25 and are rotative therewith by means of a corresponding key 26 and key-way 27 in the bore of the disk, (Figs. 6 and 6ª). Between each pair of disks a stop collar 28 is secured on shaft 25 and the disks are normally movable respecting said collars, the disks of each pair being normally spring pressed toward the corresponding collar for engagement with the corresponding disk 22 resiliently. The outermost disks 23 and 24 are pressed by coil springs 29 on shaft 25 that are opposed by stop collars 30 thereon.

Between adjacent disks 23, 24 a coil spring 31 is located adapted to press said disks toward the corresponding associate disk 22. The disks 23, 24 have hubs 32 provided with recesses 33, opposing each other, containing the corresponding spring 31, (Figs. 6 and 6ª). The shaft 25 is longitudinally reciprocative so as to alternately move the disks 23 or 24 into engagement with diametrically opposite sides of the driving disks 22 to rotate the latter and the tools A alternately in opposite directions as the work requires, in accordance with the reciprocations of the carrier 2. To reciprocate the shaft 25 a rock arm 34 is pivotally supported on the main frame at 35 and is shown provided with a fork 34ª and screws 36 engaging a collar 37 journaled on said shaft between stops 38 secured on the shaft on opposite sides of the collar, (Figs. 1 and 3). The arm 34 is shown of bell-crank variety in which the portion 34ª is pivotally connected with a link 39, the lower end of which link is pivoted at 40 to an arm 41 that is pivoted at 42 to a bracket 43 extending from bearing 44 on the main frame, in which the shaft 45 is journaled, (Figs. 3, 7 and 8). A shaft 46 journaled on the main frame is provided with cam 47 whose cam groove 47ª receives the pin or projection 40, or a roller 40ª thereon, for reciprocating the link 39 to cause reciprocations of shaft 25, (Figs. 7 and 8). Shaft 46 carries a gear 48 in mesh with a gear 49 on a shaft 50 journaled in bearings on the main frame and shown provided with a gear 51 in mesh with a gear 52 on shaft 53 journaled on the main frame, (Figs. 7 and 8). The shaft 53 is shown provided with a gear 54 in mesh with a gear 55 on shaft 56 that may be driven in any suitable way, as by means of fast and loose pulleys 57 and 58 thereon, (Figs. 3 and 7). The gearing shown is to give proper timing to the various parts but may be changed as may be desired. Upon shaft 56 is shown a pulley 59 from which belt 60 passes to a pulley 61 secured on shaft 25 for rotating the latter at the desired speed. With the construction described, when shaft 56 is rotated the shaft 25 will be rotated and the link 39 will be reciprocated for causing longitudinal reciprocations of shaft 25 to cause the disks 23 to engage the disks 22 to rotate the tools A in one direction, and to cause the disks 23 to be disengaged from disks 22 and to cause the disks 24 to engage the disks 22 for reverse rotation of the tools, in accordance with the rotation of cam 47.

The tools are to be reciprocated in accordance with the work to be performed, for which purpose the reciprocative frame 2 is raised and lowered with respect to the articles B, (Figs. 4 and 5), as required. The guide rods 2ᵇ are shown provided with projections 62 that are engaged by rock arms 63 that are secured on a transverse shaft 64 journaled in bearings on frame 1. One of the arms 63 is shown in the form of a bell-crank, (Fig. 2), the portion 63ª of which is shown provided with a roller 65 engaging a cam 66 secured on shaft 50, whereby for each rotation of said cam the arms 63 will be rocked to correspondingly raise and lower the member 2 with the tools. The weight of the member 2 resting upon the arms 63 keeps the roller 65 in contact with cam 66. In order to be able to vary the timing of the reciprocations of member 2 with the tools the cam 66 is shown made in two parts 66ª and 66ᵇ located side by side, the part 66ª being secured to shaft 50 and the part 66ᵇ being adjustable with respect to the part 66ª by means of slots and screws. For such purpose the part 66ᵇ is shown provided with arcuate slots 66ᶜ receiving screws 67 threaded into the part 66ª, (Fig. 2), whereby the part 66ᵇ may be adjusted and set angularly with respect to part 66ª so that the high parts of the cams will follow in a desired sequence with respect to the roller 65 for a longer or shorter raising of the tools during each rotation of cam 66.

Since the tools A are spaced apart I provide an endless conveyor or carrier 68 for the articles or work A, shown in chain-like form, carried by sprockets 69 and 70 journaled upon the main frame below the tools, (Fig. 1). The sprocket 69 is secured by means of screw 71 to the shaft 45 and the sprocket 70 is shown secured by screw 72 to a shaft 73 journaled in bearings on the main frame parallel with shaft 45, (Figs. 1 and 7). The carrier is shown comprising links 68ª, adapted to receive the teeth of the sprockets 69 and 70, and intermediate links shown in the form of plates 68ᵇ pivotally connected with the links 68ª, upon which plates the articles B to be drilled, tapped or the like are located. To provide for convenience in locating various articles B upon the carrier, according to the character of the articles and the work to be performed thereon, I provide blocks 74 which may be detachably secured upon the conveyor plates by means of screws 75 passing through holes 74ª in the blocks 74, (Fig. 5), and entering threaded holes 68' in the plates 68ᵇ, (Fig. 1). The blocks 74 are shown provided with pins 76 spaced in such positions as to retain the articles B from lateral displacement, (Fig. 5), said pins being located on the blocks in positions corresponding to the shapes of the articles B, as in the nature of a jig. With the construction described the articles may be readily placed upon the successive blocks 74 to be carried under the tools, traveling from the right hand to the left hand side in Fig. 1, and such articles after tool operations thereon will drop off of the carrier as at the left hand side of said figure.

In order to adjust the conveyor 68 respecting the tools the sprocket 69 is shown made in two main parts comprising a disk $69^a$ provided with the sprocket teeth $69^b$ and a separate hub portion $69^c$ secured by screw 71 to shaft 45, (Fig. 1), the disk $69^a$ being provided with a projection 69' located between spaced fingers 69'' extending from hub $69^c$, said fingers being provided with screws 77 adapted to engage the projection 69', (Fig 1). By adjusting the screws 77 with respect to the projections 69' the disk $69^a$ and the sprocket teeth $69^b$ may be adjusted angularly respecting shaft 45 to set the conveyor respecting shaft 45 and the tools A.

In order to firmly hold the articles B upon the blocks 74 when the tools are operating on the latter, and to resist withdrawing of the articles from said blocks when the tools recede from the latter, I provide resiliently operating pressers or plungers 78 that are located over the articles B on the conveyor and are carried by the reciprocative member 2 (Figs. 1 and 3). The pressers 78 are shown in the form of rods slidable in bushings 79 shown externally threaded and carried by supports 80 having depending portions $80^a$ adjustably secured for lateral adjustment on a transverse rod 81 secured to the rods $2^b$, the rod 81 being attached to the hubs $62^a$ of the projections 62. The depending portions $80^a$ are shown provided with split ends at $80^b$ having screws 82, (Fig. 3), whereby the supports 80 and the pressers 78 may be adjusted along the rod 81 with respect to the associate spindle 8 and tool A and may be held fast, there being one of the pressers for each tool. The pressers 78 are provided with stops 78' against which a corresponding coil spring 83 bears, the upper end of said spring bearing against the corresponding bushing, the pressers 78 having pins 84 to bear against the upper ends of the bushings to limit the downward thrust of the pressers, (Fig. 1). The pressers may be adjusted vertically with respect to the corresponding support 80 by means of nuts 85 on opposite sides of support 80 to regulate the position of the pressers regarding the articles B. The pressers 78, at their lower ends, extend below the lower ends of the tools A so that when the tool carrier 2 is depressed the pressers 78 will be carried down with the rods $2^b$ equally with the depression of the tools, and said pressers will first engage the articles B on the conveyor to keep them in firm position when the tools operate thereon and will maintain pressure on said articles until the tools have retreated from the articles.

The conveyor is to be operated step-by-step with respect to the tools. I have illustrated a slotted member 86 of a Geneva movement secured on shaft 45 and cooperative with a rotative projection 87 on an arm 88 secured on shaft 46, (Figs. 3, 7 and 8), whereby for each rotation of shaft 46 the projection 87 will engage the member 86 to rotate shaft 45 a step, whereby to advance the carrier a corresponding step so that a plate $68^b$ will be brought to rest beneath a tool and its associate presser 78 for each stop of the conveyor.

The operation may be described as follows:

With the parts in the position shown in Fig. 1 it may be assumed that the disks 23 will be in engagement with the drive disks 22 for rotating the tools, and that the reciprocative carrier 2 will be caused to descend by the operation of cam 66, the pressers 78 first engaging the articles B and the tools will engage the articles and the conveyor will be at rest. When the rotating tools have descended the required distance the shaft 25 will be shifted to the right in Fig. 6 to disengage the disks 23, 22 and engage the disks 24, 22 for reversing the rotation of the tools, and at the appropriate moment cam 66 will cause the carrier 2 to rise and withdraw the tools from the work, the pressers 78 momentarily continuing temporarily to hold down the work. When the tools have risen sufficiently clear from the work the conveyor will be advanced a step. The shaft 25 will be shifted to the left in Fig. 6 to disengage the disks 24 from the disks 22 and engage the disks 23 and 22 again for rotating the tools in the required direction, the carrier 2 again descending with the tools, and the operations will be repeated. Since there are several tools A spaced apart each tool will perform its function at a desired part of the articles B so that various holes may be drilled, tapped or reamed in the articles in a successive way as may be required in the work. Each time the conveyor comes to rest a new article B will be manually placed thereon and the finished articles will drop from the conveyor successively.

My improvements will be found advantageous in that similar work may be performed in or upon successive articles by merely applying such articles upon the conveyor plates as the conveyor advances without requiring each article to be individually set for each tool, since when the tools have once been set according to the work to be performed the successive articles will be in the required position for the respective tools, and since all the tools operate upon several articles at the same time the final result will be the delivery of the finished articles in the space of time it would otherwise require to drill, tap or ream one hole in an article.

My invention is not limited to the details of construction and arrangement of parts set forth, since the same may be varied, within the scope of the appended claim, without departing from the spirit of my invention.

Having now described my invention what I claim is:—

A machine of the character described comprising a reciprocative tool carrier, means to reciprocate the carrier, spaced spindles for tools supported by the carrier, means to rotate the spindles in opposite directions in accordance with the reciprocations of the carrier, a resilient presser associated with each spindle, the pressers including a support adjustably carried by the carrier, a bushing on the support, a rod slidable in the bushing, a spring operative with the rod to normally press the latter toward the work, and means to limit movement of the presser rods toward the work, the bushings being adjustably carried by the supports, the presser rods having stops opposing the springs, the springs opposing the bushings.

PETER MEYER.